United States Patent [19]

Dörr et al.

[11] Patent Number: 4,910,011

[45] Date of Patent: Mar. 20, 1990

[54] PROCESS OF PURIFYING FLUE GASES

[75] Inventors: Karl-Heinz Dörr, Mainz; Hugo Grimm, Miltenberg/Main; Heinz Neumann, Bad König; Norbert Olhms, Münster/Westf., all of Fed. Rep. of Germany

[73] Assignees: Metallgesellschaft AG, Frankfurt am Main; Stadtwerke Munster GmbH, Munster/Westf., both of Fed. Rep. of Germany

[21] Appl. No.: 284,210

[22] Filed: Dec. 14, 1988

[30] Foreign Application Priority Data

Dec. 24, 1987 [DE] Fed. Rep. of Germany ....... 3744031

[51] Int. Cl.$^4$ .................. C01B 17/98; C01B 7/00; C01B 17/00; B01T 8/00
[52] U.S. Cl. .................. 423/522; 423/239; 423/240; 423/244
[58] Field of Search ............ 423/239, 239 A, 244 A, 423/244 R, 522, 240 R

[56] References Cited

U.S. PATENT DOCUMENTS

| | | | |
|---|---|---|---|
| 3,607,034 | 9/1971 | Henry et al. | 423/522 |
| 3,647,360 | 3/1972 | Jaeger | 423/522 |
| 4,744,967 | 5/1988 | Brand et al. | 423/239 |

FOREIGN PATENT DOCUMENTS

| | | |
|---|---|---|
| 3407277 | 8/1985 | Fed. Rep. of Germany . |
| 3514711 | 10/1986 | Fed. Rep. of Germany . |
| 3601378 | 7/1987 | Fed. Rep. of Germany . |

OTHER PUBLICATIONS

B.W.K. Brennstoff Warme Kraft, Band 37, No. 9, Sep. 1985, Seiten 77–84, Dusseldorf, DE; B. Scharer et al.: "Zur Wirtschaftlichkeit der NOx-Abgasreinigung bei Grossfeuerungsanlagen", *FIG. 2b; Seiten 79–80*.

*Primary Examiner*—Gregory A. Heller
*Attorney, Agent, or Firm*—Sprung Horn Kramer & Woods

[57] ABSTRACT

In flue gases or other humid exhaust gases which are relatively cold and contain $SO_2$, $NO_2$ and other gaseous pollutants, the $SO_2$ content is oxidized to $SO_3$ and the NO content is reduced by a catalytic treatment, the $SO_3$ content is condensed as sulfuric acid and other gaseous pollutants are removed by being scrubbed with aqueous liquids at low temperatures. In order to heat up the flue gas to the temperature required for the catalysis, the flue gas is heated up in a first heating-up stage by an indirect heat exchange with the catalytically treated gas before the catalytic treatment, the heated-up gas is heated up further in a second heating-up stage to the temperature required for the catalytic treatment, the catalytically treated gas which has been cooled in the first heating-up stage is cooled further in an indirect heat exchanger below the dew point temperature of sulfuric acid and is subsequently fed to an $SO_3$ condenser. The remaining sulfuric acid vapor is absorbed by sprayed dilute sulfuric acid to form a dilute sulfuric acid having a predetermined concentration, the gas leaving the $SO_3$ condenser is scrubbed in a scrubber with a sprayed aqueous liquid and is thus cooled to 40° to 60° C. and the purified gas is reheated to the required chimney inlet temperature.

11 Claims, 2 Drawing Sheets

PROCESS OF PURIFYING FLUE GASES

BACKGROUND OF THE INVENTION

This invention relates to a process of purifying flue gases or other humid exhaust gases which contain $SO_2$, $NO_x$ and other gaseous polluants, wherein the $SO_2$ content is oxidized to $SO_3$ and the $NO_x$ content is reduced by a catalytic treatment, the $SO_3$ content is condensed as sulfuric acid and other gaseous polluants are removed by being scrubbed with aqueous liquids at low temperatures.

Flue gases from fuel-firing furnaces contain pollutants consisting mainly of $SO_2$, $NO_x$, HCl and HF. For instance, the combustion of Ruhr coal which contains 1% sulfur by weight in large furnaces will result in a flue gas which contains 6% by volume oxygen and contains per $sm^3$ between 1800 and 2000 mg $SO_2$, below 150 mg HCl and below 50 mg HF. In dependence on the combustion process and the coal employed the $NO_x$ content will range from less than 600 to and above 2000 mg $NO_2/sm^3$.

It is known that the flue gas can be catalytically aftertreated in order to decrease the emission of such pollutants. By that aftertreatment the $SO_2$ is oxidized to $SO_3$ and the $NO_x$ is reduced with $NH_3$ to $N_2$. The humid gas is subsequently cooled below the dew point temperature of sulfuric acid and the $SO_3$ is condensed as sulfuric acid.

Such a process is known from Published German application No. 33 31 545. The $SO_2$-containing hot flue gas is adjusted to the temperature which is required for the catalysis and is subsequently catalytically reacted. The $SO_3$-containing humid gas is cooled in a first stage of an air preheater to a temperature above the dew point temperature of sulfuric acid and is subsequently cooled in a second stage below the dew point temperature of sulfuric acid. The second stage of the air preheater consists of an acid-resisting material, such as glass tubes. In the second stage the gas cannot be cooled below a temperature with which the minimum chimney inlet temperature prescribed in the regulation for large fuel-firing plants and the required lift of the exhaust gas in the chimney are still ensured. As a result, the gas cannot be subjected to a fine purification at low temperatures.

U.S. Pat. No. 4,164,546 describes such a process in which the hot flue gases are catalytically treated with an addition of ammonia. After the catalysis the $SO_3$ content may be removed by means of an aqueous absorbent solution. During the absorption the gas must not be cooled below the required minimum chimney inlet temperature of the gas.

Published German application No. 36 01 378 describes a process in which the hot flue gases are catalytically treated with an addition of ammonia. After the catalysis and an interstage cooling, the $SO_3$ is reacted with water to form sulfuric acid and the purified gas is delivered to the chimney. In that case too the exit temperature from the $SO_3$ absorber must correspond to the required chimney inlet temperature.

In the unpublished German patent application No. P 36 24 462.7 a process has been described in which the hot flue gases are also adjusted to a suitable temperature before the catalysis. After the catalysis the flue gas is cooled in a heat exchanger by an indirect heat exchange to a temperature below the dew point temperature of sulfuric acid. The cooled gas is cooled further to a predetermined temperature by sprayed dilute sulfuric acid in a countercurrent operation, and a dilute sulfuric acid having a predetermined concentration is condensed. The gas exiting from the $SO_3$ condenser is scrubbed in a fine scrubber by a sprayed aqueous liquid and is thus cooled to 40° to 55° C. The gas exiting from the fine scrubber is reheated in a reheater to a predetermined temperature by sprayed dilute sulfuric acid. The gas from which $SO_3$ has been condensed is passed through a filter. Dilute sulfuric acid from the reheater is sprayed into the $SO_3$ condenser. The temperature of the gas in the reheater is so selected that the water that has been absorbed in the scrubber will not condense and the temperature of the gas exiting from the heat exchanger is adjusted approximately to such a temperature that the temperature of the dilute sulfuric acid obtained in the $SO_3$ condenser is approximately the temperature of the gas in the reheater. The dilute sulfuric acid is sprayed into the reheater at such a rate that the dilute sulfuric acid drained from the reheater is approximately at the required gas exit temperature from the $SO_3$ condenser.

In that process the gases can be subjected to a fine purification at low temperatures after the catalysis because the gases can subsequently be reheated to the required minimum chimney inlet temperature. But before the catalysis the flue gases must be at the temperature which is required for the catalysis.

In many cases, e.g., when dust has previously been collected at lower temperatures, the temperature of the flue gases before the catalysis is too low for the catalysis.

It is an object of the invention to permit a catalytic treatment of relatively cold and substantially dustfree flue gases and a subsequent recovery of sulfuric acid and fine purification in a most economical manner.

SUMMARY OF THE INVENTION

That object is accomplished in accordance with the invention in that the flue gas is heated up in a first heating-up stage by an indirect heat exchange with the catalytically treated gas before the catalytic treatment, the heated-up gas is heated up further in a second heating-up stage to the temperature required for the catalytic treatment, the catalytically treated gas which has been cooled in the first heating-up stage is cooled further in an indirect heat exchanger below the dew point temperature of sulfuric acid and is subsequently fed to an $SO_3$ condenser, the remaining sulfuric acid vapor is absorbed by sprayed dilute sulfuric acid to form a dilute sulfuric acid having a predetermined concentration, the gas leaving the $SO_3$ condenser is scrubbed in a scrubber with a sprayed aqueous liquid and is thus cooled to 40° to 60° C. and the purified gas is reheated to the required chimney inlet temperature.

In the first heating-up stage the flue gas is heated up in such a manner that the catalytically treated gas which is being cooled is not cooled below the dew point temperature of sulfuric acid and is at a temperature of 180° to 250° C. The flue gas may be heated further in the second heating-up stage by a direct or indirect transfer of heat. The most desirable heat source will be selected with which that temperature will be obtained which is required for the admission to the catalytic treatment. The indirect heat exchanger for the further cooling of the catalytically treated gas below the dew point temperature of sulfuric acid is corrosion-resistant and consists, e.g., of a tubular heat exchanger comprising glass tubes, plastic-coated tubes or tubes coated with vitreous enamel or graphite tubes. The gas is adjusted to have an exit temperature of about 120° to 140° C. The sulfuric acid which has condensed in the heat exchanger may flow into the succeeding $SO_3$ condenser or may be withdrawn as a product and has a somewhat higher concentration than in the condenser. The $SO_3$ condenser may consist of an empty tower or of a tower having a packed bed or of a tower including one or more nozzle plates, onto which the dilute sulfuric acid is sprayed. The dilute sulfuric acid may be sprayed or sprinkled. The gas outlet may be preceded by a mist separator. The dilute sulfuric acid is collected in a sump at the bottom. A vertical or horizontal venturi may be provided between the indirect heat exchanger and the $SO_3$ condenser and may be used for an additional treatment of the gas by sprayed dilute sulfuric acid. The dilute sulfuric acid is recirculated. The concentration of the dilute sulfuric acid which is obtained will depend on the gas exit temperature from the $SO_3$ condenser. That exit temperature will depend on the temperature at which the dilute sulfuric acid enters the $SO_3$ condenser. The succeeding scrubber may be designed like the $SO_3$ condenser or may consist of a venturi for a fine scrubbing in a cocurrent operation. The scrubber may be mounted on top of the $SO_3$ condenser or may be separately mounted. In either case the liquid circuits will not communicate with each other. The aqueous liquid may consist of water or of highly dilute sulfuric acid having a concentration up to about 20% or of any other liquid which can absorb HCl and HF. The aqueous liquid is suitably recirculated and cooled by an evaporation of water. The water which has been absorbed by the gas is replaced. Alternatively, a cooling by an indirect heat exchange may be effected. The pollutants absorbed by the water are continuously removed from a branch stream which has been diverted or are discontinuously removed, e.g., by stripping and a succeeding neutralization. The gas outlet from the scrubber may be preceded by a filter, which may consist of a plug filter, a wire mesh filter, a lamellar filter or a filter bed of bulk material. The temperature to which the gas is cooled in the $SO_3$ condenser will depend on the partial pressure of the $H_2O/H_2SO_4$ contained in the mixture. The concentration of the condensed dilute sulfuric acid is mainly selected in the range from 60 to 90% by weight. That predetermined value will determine the required temperature for the dilute sulfuric acid which is sprayed into the $SO_3$ condenser.

In accordance with a preferred feature, the purified gas is reheated to the required chimney inlet temperature in a reheater by a direct heat exchange with dilute sulfuric acid from the $SO_3$ condenser, dilute sulfuric acid from the reheater is sprayed into the $SO_3$ condenser, the catalytically treated gas is cooled in the indirect heat exchanger by a heat exchange with air or water, the temperature of the purified gas in the reheater is so selected that the water that has been absorbed in the scrubber will not condense and will remain in the exiting gas, the gas exit temperature from the indirect heat exchanger is approximately so adjusted that the temperature of the dilute sulfuric acid obtained in the $SO_3$ condenser approximately corresponds to the temperature of the purified gas in the reheater, and sulfuric acid is sprayed into the reheater at such a rate that the dilute sulfuric acid drained from the reheater is approximately at the required gas exit temperature from the $SO_3$ condenser. The reheater may be designed like the $SO_3$ condenser and may be mounted on the scrubber or may be separately mounted. The gas outlet from the reheater or the scrubber may be preceded by a filter. The sumps of the reheater and of the $SO_3$ condenser may be interconnected to an equalization of the quantities of acid. The temperature to which the gas is cooled in the $SO_3$ condenser will depend on the partial pressure of the $H_2O/H_2SO_4$ contained in the mixture. The concentration of the condensed dilute sulfuric acid is mainly selected in the range from 60 to 75% by weight. That preselected concentration and the rate at which water is absorbed there by the gas will determine all other temperatures and acid rates which are required. If the indirect cooler is not absolutely gastight, e.g., if glass tubes are used having ends which cannot be packed to form absolutely gastight joints, air will be used as a cooling fluid and its pressure in the cooler will be so adjusted that only air can leak into the gas rather than gas into the air. If the cooler is absolutely gastight, water may also be used as a cooling fluid. The heat which is transferred to the cooling fluid may be usefully employed for other purposes.

In accordance with a preferred feature the temperature of the gas exiting from the reheater is increased by an admixing of hot gas. Temperature fluctuations may effectively be compensated by an admixing of a small partial stream, e.g., of hot air. Such admixing may also be required if structural materials are used which require the concentration of the sulfuric acid to be kept so low that the required exhaust gas temperature cannot entirely be obtained.

In accordance with a preferred feature the temperature of the dilute sulfuric acid fed from the $SO_3$ condenser to the reheater is increased by an indirect heat exchange. The problems described hereinbefore can be solved also by that measure. Heating-up is effected with extraneous heat, such as steam.

In accordance with a preferred feature the dilute sulfuric acid has a concentration of 60 to 75% by weight and the dilute sulfuric acid fed from the $SO_3$ condenser to the reheater is at a temperature from 70° to 110° C. With that concentration and temperature the desired gas exit temperature from the reheater will be obtained in a particularly desirable and economical manner.

In accordance with a further preferred feature the purified gas is reheated to the required chimney inlet temperature by an indirect heat exchange with the catalytically treated gas. In that case the reheating of the gases to the inlet temperature for the chimney will be effected by an indirect heat exchange rather than by a direct heat exchange as in accordance with the previous features. The acid recirculated through the $SO_3$ condenser is cooled by an addition of water and/or by an indirect cooling. Alternatively, the dilute sulfuric acid supplied to the $SO_3$ condenser may be at the inlet temperature of the catalytically treated gas so that the gas will not be cooled in the $SO_3$ condenser and the sulfuric acid vapor will be removed only by absorption. This will result in a dilute sulfuric acid having a higher concentration.

In accordance with a further preferred feature the dilute sulfuric acid has a concentration of 60 to 90% by weight and is at a temperature of 100° to 140° C. An effective separation at high concentrations will be achieved with such concentrations and temperatures.

In accordance with a further preferred feature the liquid sprayed into the fine scrubber contains $H_2O_2$ or $H_2S_2O_8$. As a result, residual $SO_2$ will also be oxidized and absorbed as $SO_3$. Besides, fluctuations in the catalytic conversion of $SO_2$ to $SO_3$ or a failure of the catalyt may be compensated and the $NO_x$ content will be decreased.

In accordance with a further preferred feature the flue gas is heated up to a temperature of 400° to 430° C. in the first heating-up stage. In that case the heat content of the catalytically treated gases will effectively be utilized and a condensation in said gases will reliably be avoided because the catalytically treated gases are cooled to a temperature of 180° to 250° C.

In accordance with a further preferred feature the catalytically treated gas is cooled to a temperature of 120° to 160° C. in the indirect heat exchanger. That temperature will result in very good conditions for the succeeding treatment of the gas and in a high utilization of heat by the cooling fluid or for the reheating of the purified gases.

In accordance with a further preferred feature the aqueous liquid sprayed into the scrubber is recirculated and is cooled by an evaporation of water. This will result in a high concentration of the pollutants in the scrubbing fluid and the further processing will be facilitated. Besides the utilization of any $H_2O_2$ or $H_2S_2O_8$ will be improved.

In accordance with a further preferred feature, the subatmospheric pressure that is produced by a fan which precedes the chimney is automatically controlled so that atmospheric pressure is obtained at least in the line for feeding the catalytically treated gas to the indirect heat exchanger. As a result, any leak in the indirect heat exchanger can only cause air to leak into the gas stream whereas gas cannot enter the atmosphere.

The invention will be explained more in detail with reference to the drawings and examples.

DETAILED DESCRIPTION OF THE INVENTION

Figure 1:
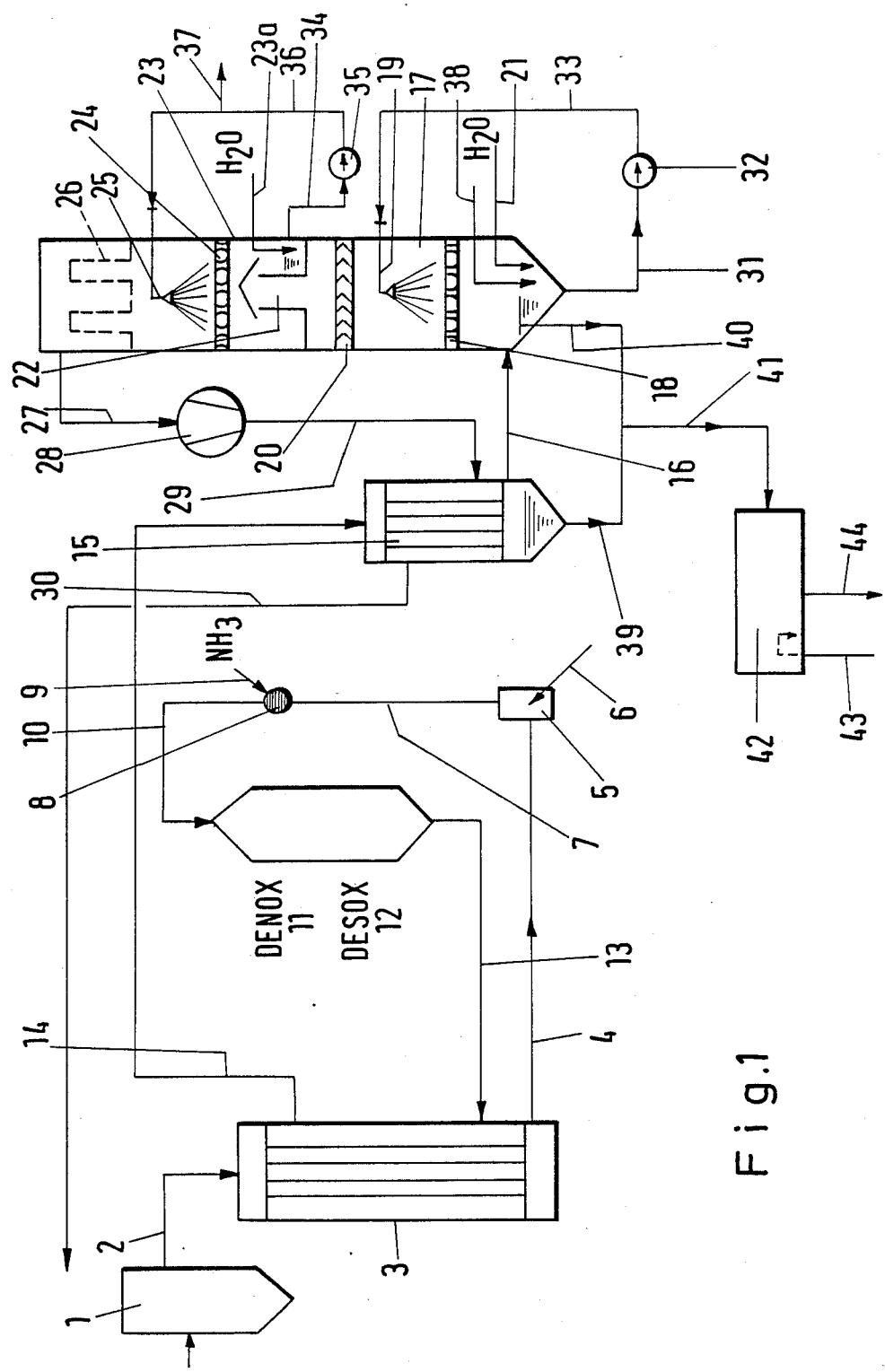
FIG. 1 is a flow scheme of a plant in which the purified gas is reheated to the required chimney inlet temperature by a heat exchange with the catalytically treated gas.

Example 1 (FIG. 1)

At a rate of 120,000 sm$^3$/h, flue gases from a coal-firing furnace are supplied to the electrostatic precipitator 1, which is operated at a low temperature and collects dust from the flue gas. Per sm$^3$ the flue gases contain 2000 mg $SO_2$, 800 mg $NO_x$, 50 mg $SO_3$, 150 mg HCl, 30 mg HF, 50 g $H_2O$. At a temperature of 170° they are fed in line 2 to the tubular heat exchanger 3, in which they are preheated to 420° C. They are subsequently fed in line 4 to the heater 5, in which fuel oil or fuel gas is burnt by a burner 6 to increase the gas temperature to 450° C. The fuel gas which has been heated up is supplied in line 7 to the mixing chamber 8, in which $NH_3$ from line 9 is admixed to the flue gas. In line 10 the gas is fed to the tower 11, 12 for a DENOX-DESOX catalysis. In the DENOX catalyst section 11, the $NO_x$ is reduced with $NH_3$ to $N_2$. In the DESOX catalyst section 12 the $SO_2$ is oxidized to $SO_3$. At a temperature of 450° C. the catalytically treated gas is fed in line 13 to the tubular heat exchanger 3 and is cooled there to 200° C. by an indirect heat exchange with the flue gases and is then fed in line 14 to the tubular heat exchanger 15 and is cooled there below the dew point temperature of sulfuric acid to a temperature of 120° C., whereby 40% of the $SO_3$ contained in the flue gas are condensed as sulfuric acid. In line 16 the gas is supplied to the $SO_3$ condenser 17, which is provided with a distributor plate 18, a sprayer 19 and a mist separator 20. By an evaporation of water the gas is cooled from 120° to 100° C. Water at a rate of 1.2 m$^3$/h is fed through line 21 to the $SO_3$ condenser and is evaporated there. In the $SO_3$ condenser 17, 60% of the $SO_3$ contained in the gas are condensed as sulfuric acid and are absorbed. The flue gas from which the $SO_3$ has substantially been removed will flow at a temperature of 100° C. in line 22 to the scrubber 23, which is provided with a distributor plate 24 and a sprayer 25. The gas is cooled to 40° C. by an evaporation of water. Water at a rate of 3.6 m$^3$/h is fed in line 23a to the scrubber 23 and is evaporated there. The HCl, HF and traces of $SO_2$ and $SO_3$ contained in the gas are substantially scrubbed off by means of acidulated water or a sulfuric acid having a concentration of 5 to 20% by weight. $H_2SO_4$ mists are separated in a plug filter 26. The purified gas is fed via line 27, fan 28 and line 29 to the tubular heat exchanger 15 and is reheated therein to 120° C. and is subsequently delivered in line 30 to the chimney. Per sm$^3$ the purified gas contains 130 to 150 mg $SO_2$, 30 to 40 mg $SO_3$, 50 to 60 mg HCl, 50 to 60 mg $NO_x$ (calculated as NO), traces of HF and 90 g $H_2O$. At a rate of 250 m$^3$/h, sulfuric acid having a concentration of 70% by weight $H_2SO_4$ is recirculated from the sump of the $SO_3$ condenser 17 via the line 31, pump 32, line 33 and sprayer 19. At a rate of 150 m$^3$/h, acidulated water at a temperature of 40° C. is recirculated from the sump of the scrubber 23 via line 34, pump 35, line 36 and sprayer 25. At a rate of 0.5 m$^3$/h, acidulated water laden with HCl and HF is fed to a stripping plant, not shown, where the HCl and HF are removed, and the acidulated water is subsequently recycled in line 38 to the $SO_3$ condenser 17. The sulfuric acid formed in the tubular heat exchanger 15 and in the $SO_3$ condenser 17 at a rate of 7.0 m$^3$/day has a concentration of 73.5% by weight $H_2SO_4$ and is at a mixed temperature of 110° C. and is fed in lines 39, 40 and 41 to a single-stage concentrating plant 42, where the concentration is increased to 92% by weight $H_2SO_4$. $H_2O_2$ from line 43 is admixed to decolorize the product acid. A product obtained at a rate of 5.1 m$^3$/day and having a concentration of 92% $H_2SO_4$ by weight is delivered via line 44.

Figure 2:
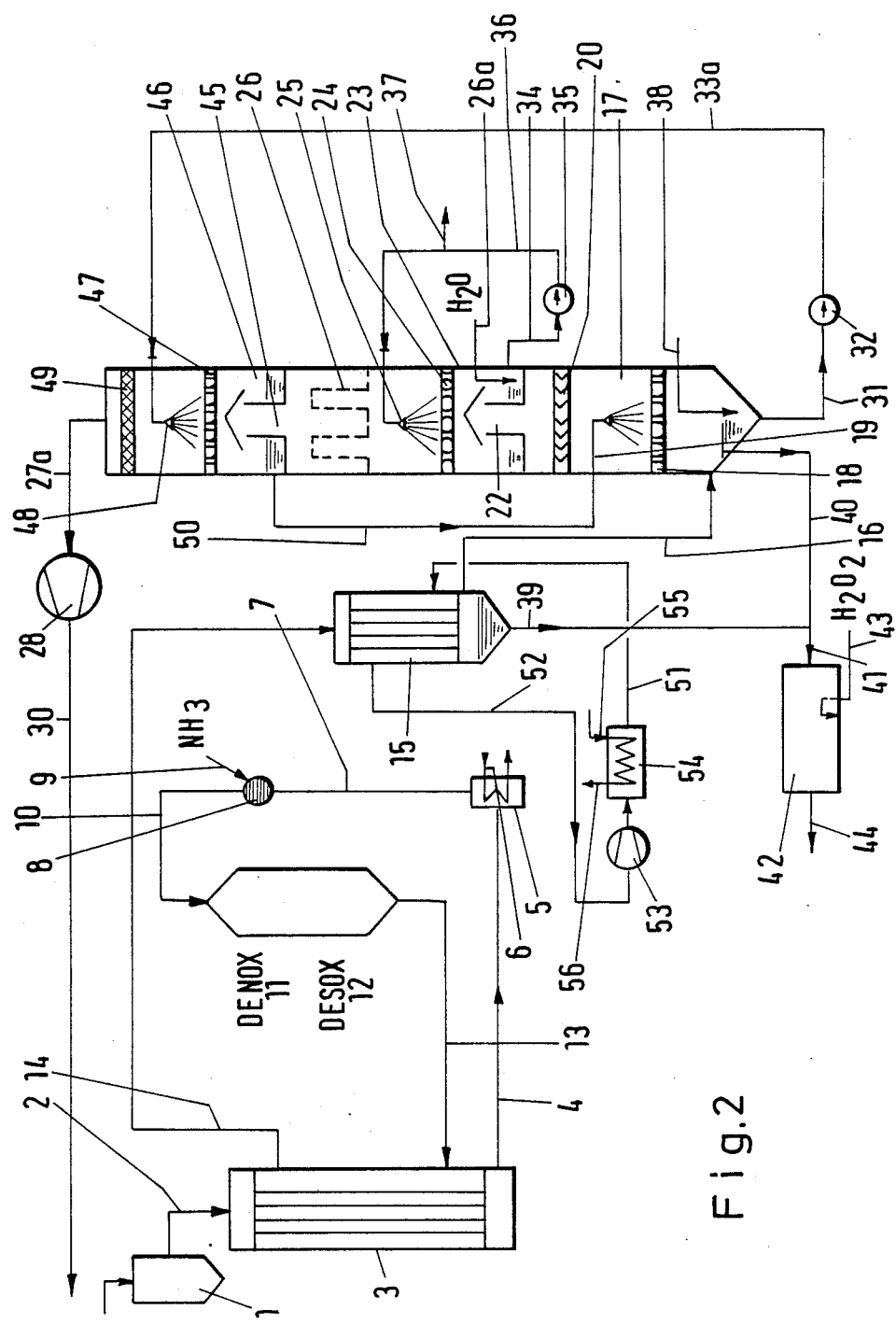
FIG. 2 is a flow scheme of a plant in which the purified gas is reheated to the required chimney inlet temperature by a direct heat exchange with dilute sulfuric acid from the $SO_3$ condenser.

Example 2 (FIG. 2)

The flue gas is supplied at the same rate and temperature and has the came composition as in Example 1 and is preheated to 420° C. in the tubular heat exchanger 3 and is heated up further to 450° C. in an indirect preheater 5 by means of superheated steam from line 6. The flue gas is catalytically treated as in Example 1. The flue gas which has substantially been catalytically treated is fed at a temperature of 450° C. in line 13 to the tubular heat exchanger 3 and in an indirect heat exchange with the flue gas is cooled to 200° C. In line 14 the gas is fed at a temperature of 200° C. to the tubular heat exchanger 15 and is cooled therein to 157° C., whereby 30% of the $SO_3$ contained in the flue gas are condensed and removed as sulfuric acid. In the $SO_3$ condenser 17 the gas is cooled to 92° C., whereby 70% of the $SO_3$ contained in the flue gas are condensed and absorbed as sulfuric acid. In line 22 the gas at a temperature of 92° C.

enters the scrubber 23 and is cooled therein to 40° C. Sulfuric acid mists are separated in the plug filter 26. At a temperature of 40° C. the gas is fed in line 45 to the direct reheating tower 46, which is provided with a distributor plate 47, a sprayer 48 and a mist separator 49. In the reheating tower 46 the purified gas is reheated to 105° C. and is then fed to the chimney via line 27a, fan 28 and line 30. Per sm³ the purified gas contains 130 to 150 mg $SO_2$, 30 to 40 mg $SO_3$, 50 to 60 mg HCl, 50 to 60 mg $SO_2$, 50 to 60 mg $NO_x$ (calculated as NO), traces of HF, 78 g $H_2O$. The cooling of the gas from 92° C. to 40° C. in the scrubber 23 is effected by an evaporation of water. Water at a rate of 2.4 m³/h is fed via line 26a to the scrubber 23 and is evaporated therein. At a rate of 255 m³/h, sulfuric acid having a concentration of 70% by weight $H_2SO_4$ is fed at a temperature of 105° C. from the sump of the $SO_3$ condenser 17 via line 31, pump 32, line 33a to the sprayer 48 in the reheating tower 46. From the reheating tower 46, the acid which has been cooled to 92° C. is recycled via line 50 and the sprayer 19 to the $SO_3$ condenser and is reheated therein to 105° C. At a rate of 150 m³/h, acidulated water at a temperature of 40° C. is fed from the sump of the scrubber 23 via line 34, pump 35 and line 36 to the sprayer 25. Sulfuric acid which has a concentration of 73% by weight $H_2SO_4$ and is at a mixed temperature of 110° C. is obtained in the tubular heat exchanger 15 and the $SO_3$ condenser 17 at a rate of about 7.0 m³/day and via lines 39, 40 and 41 is fed to a concentrating plant 42 and is strengthened therein to a concentration of 92% by weight $H_2SO_4$. $H_2O_2$ from line 43 is admixed to decolorize the product acid, which has a concentration of 92% by weight $H_2SO_4$ and is delivered via line 44 at a rate of 5.1 m³/day. At a rate of 0.5 m³/h, acidulated water laden with HCl and HF is fed in line 37 to a stripping plant, not shown, in which HCl and HF are removed and from which the acidulated water is recycled in line 38 to the $SO_3$ condenser 17. At a rate of 91,000 sm³/h, air at a temperature of 100° C. is fed in line 51 to the tubular heat exchanger 15 and is heated up therein to 160° C. whereas the $SO_3$-containing gas is cooled from 200° C. to 157° C. The air is recirculated via line 52, fan 53 and feed water preheater 54. At a rate of 31 m³/h, feed water is fed in line 55 to the feed water preheater and is heated up therein from 40° C. to 95° C. and is delivered in line 56.

The advantages afforded by the invention reside in that relatively cool flue gases can economically be heated up with a supply of a very small quantity of extraneous energy to the temperature required for the catalytic treatment, sulfuric acid can be recovered from the catalytically treated gases and the gases can be subjected to a fine purification and nevertheless the gases can be reheated without a use of extraneous heat to the minimum temperature required for the admission to the chimney.

What is claimed is:

1. In a process of purifying flue gases or other humid exhaust gases which contain $SO_2$, $NO_x$ and other gaseous pollutants including HCl and HF, comprising oxidizing the $SO_2$ content to $SO_3$ reducing the $NO_x$ content by a catalytic treatment, condensing the $SO_3$ content as sulfuric acid and removing other gaseous pollutants including HCl and HF by scrubbing with aqueous liquids at low temperatures, the improvement comprising prior to the catalytic treatment heating up the flue gas in a first heating-up stage by an indirect heat exchange with catalytically treated gas from the catalytic treatment, heating up the heated-up gas from the first heating-up stage in a second heating-up stage to a temperature sufficient to conduct the catalytic treatment, cooling the catalytically treated gas in the first heating-up stage in an indirect heat exchanger below the dew point temperature of sulfuric acid and subsequently feeding same to an $SO_3$ condenser, absorbing the remaining sulfuric acid vapor by sprayed dilute sulfuric acid to form a dilute sulfuric acid, scrubbing the gas leaving the $SO_3$ condenser in a scrubber with a sprayed aqueous liquid and cooling same to 40° to 60° C., reheating the purified gas to a sufficient chimney inlet temperature for venting the purified gas from a chimney.

2. A process according to claim 1, wherein the reheating of the purified gas to the chimney inlet temperature comprises reheating by a direct heat exchange with dilute sulfuric acid from the $SO_3$ condenser in a reheater, spraying dilute sulfuric acid from the reheater into the $SO_3$ condenser, cooling the catalytically treated gas in the indirect heat exchanger by a heat exchange with air or water, selecting the temperature of the purified gas in the reheater such that the water that has been absorbed in the scrubber will not condense and will remain in the exiting gas, adjusting the gas exit temperature from the indirect heat exchanger so that the temperature of the dilute sulfuric acid obtained in the $SO_3$ condenser approximately corresponds to the temperature of the purified gas in the reheater, and spraying sulfuric acid into the reheater at such a rate that the dilute sulfuric acid drained from the reheater is approximately at the gas exit temperature from the $SO_3$ condenser.

3. A process according to claim 2, further comprising increasing the temperature of the gas exiting from the reheater by an admixing of hot gas.

4. A process according to claim 1 or 2, further comprising increasing the temperature of the dilute sulfuric acid fed from the $SO_3$ condenser to the reheater by an indirect heat exchange.

5. A process according to claim 1, further comprising providing the dilute sulfuric acid with a concentration of 60 to 75% by weight and the dilute sulfuric acid fed from the $SO_3$ condenser to the reheater at a temperature from 70° to 110° C.

6. A process according to claim 1, further comprising reheating the purified gas to the chimney inlet temperature by an indirect heat exchange with the catalytically treated gas.

7. A process according to claim 6, further comprising providing the dilute sulfuric acid with a concentration of 60 to 90% by weight and a temperature of 100° to 140° C.

8. A process according to claim 1, wherein the aqueous liquid sprayed into the fine scrubber contains $H_2O_2$ or $H_2S_2O_8$.

9. A process according to claim 1, wherein the flue gas is heated up to a temperature of 400° to 530° C. in the first heating-up stage.

10. A process according to claim 1, wherein the catalytically treated gas is cooled to a temperature of 120° to 160° C. in the indirect heat exchanger.

11. A process according to claim 1, further comprising producing a subatmospheric pressure by a fan which precedes the chimney and automatically controlling the fan so that atmospheric pressure is obtained at least in a line for feeding the catalytically treated gas to the indirect heat exchanger.

* * * * *

UNITED STATES PATENT AND TRADEMARK OFFICE
CERTIFICATE OF CORRECTION

PATENT NO.  : 4,910,011

DATED       : March 20, 1990

INVENTOR(S) : Dorr et al.

It is certified that error appears in the above-identified patent and that said Letters Patent is hereby corrected as shown below:

Title Page          [75] Inventors:  4th inventor delete " Olhms " and substitute -- Ohlms --

Signed and Sealed this

Twenty-second Day of September, 1992

Attest:

DOUGLAS B. COMER

*Attesting Officer*            *Acting Commissioner of Patents and Trademarks*